United States Patent
Lee et al.

(10) Patent No.: US 9,965,183 B2
(45) Date of Patent: May 8, 2018

(54) METHOD FOR PROCESSING DATA IN STORAGE DEVICE AND STORAGE DEVICE

(71) Applicant: Samsung Electronics Co., Ltd., Gyeonggi-do (KR)

(72) Inventors: Woo-Sung Lee, Seoul (KR); Dong-Jun Shin, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 295 days.

(21) Appl. No.: 14/586,660

(22) Filed: Dec. 30, 2014

(65) Prior Publication Data

US 2015/0199130 A1    Jul. 16, 2015

(30) Foreign Application Priority Data

Jan. 10, 2014  (KR) .................. 10-2014-0003245

(51) Int. Cl.
   *G06F 3/06*    (2006.01)
(52) U.S. Cl.
   CPC .......... *G06F 3/0604* (2013.01); *G06F 3/0611* (2013.01); *G06F 3/0659* (2013.01); *G06F 3/0673* (2013.01); *G06F 3/0679* (2013.01)
(58) Field of Classification Search
   None
   See application file for complete search history.

(56) References Cited

U.S. PATENT DOCUMENTS

| 9,158,461 | B1 * | 10/2015 | Lee | .......................... | G06F 3/061 |
| 2003/0026138 | A1 * | 2/2003 | Lee | ...................... | G11C 7/1066 |
| | | | | | 365/194 |
| 2005/0141312 | A1 | 6/2005 | Sinclair et al. | | |
| 2005/0195635 | A1 | 9/2005 | Conley et al. | | |
| 2007/0256032 | A1 * | 11/2007 | Petri | .................. | G06F 3/04812 |
| | | | | | 715/856 |
| 2008/0307130 | A1 | 12/2008 | Chang | | |
| 2009/0276562 | A1 | 11/2009 | Lieber | | |
| 2010/0100664 | A1 | 4/2010 | Shimozono | | |
| 2010/0169549 | A1 | 7/2010 | Yano et al. | | |
| 2010/0238706 | A1 * | 9/2010 | Tokiwa | .............. | G11C 13/0004 |
| | | | | | 365/148 |
| 2012/0005404 | A1 | 1/2012 | Raz et al. | | |
| 2012/0017038 | A1 * | 1/2012 | Gorobets | ............ | G06F 11/1072 |
| | | | | | 711/103 |

(Continued)

FOREIGN PATENT DOCUMENTS

| JP | 2001319485 A | 11/2001 |
| WO | WO 02/23458 A1 | 3/2002 |

OTHER PUBLICATIONS

International Search Report dated Oct. 27, 2014 in connection with International Patent Application No. PCT/KR2014/006438, 3 pages.

(Continued)

*Primary Examiner* — Ryan Bertram

(57) ABSTRACT

In an embodiment, a method is provided for processing data in a storage device, and a storage device. The method includes writing data according to a write command received from a processor. The method also includes determining whether a predetermined write restriction time has elapsed. The method also includes discontinuing the data writing upon expiration of the predetermined write restriction time.

29 Claims, 5 Drawing Sheets

(56) References Cited

U.S. PATENT DOCUMENTS

| | | |
|---|---|---|
| 2012/0089877 A1 | 4/2012 | Takeuchi et al. |
| 2013/0246670 A1* | 9/2013 | Yamashita ............ G06F 1/3225 710/27 |
| 2014/0006690 A1 | 1/2014 | Shin et al. |
| 2014/0215129 A1* | 7/2014 | Kuzmin .............. G06F 12/0246 711/103 |

OTHER PUBLICATIONS

Written Opinion of the International Searching Authority dated Oct. 27, 2014 in connection with International Patent Application No. PCT/KR2014/006438, 4 pages.
JESD84-B451, JEDEC Standard, "Embedded Multimedia Card (eMMC), Electrical Standard 4.51", Jun. 2012, 262 pages.
Supplementary European Search Report dated Aug. 11, 2017 in connection with European Patent Application No. 14 87 7690.

* cited by examiner

METHOD FOR PROCESSING DATA IN STORAGE DEVICE AND STORAGE DEVICE

CROSS-REFERENCE TO RELATED APPLICATION(S) AND CLAIM OF PRIORITY

The present application is related to and claims the benefit under 35 U.S.C. § 119(a) of a Korean patent application filed in the Korean Intellectual Property Office on Jan. 10, 2014 and assigned Serial No. 10-2014-0003245, the entire disclosure of which is incorporated herein by reference.

TECHNICAL FIELD

The present disclosure relates to a storage device for writing or reading data and a method for processing data in the storage device.

BACKGROUND

A processor (for example, a host processor) is connected to a storage device (for example, a memory) via an Input/Output (I/O) interface. The processor writes data to the storage device or reads data from the storage device, via the I/O interface.

Data input/output may be synchronous or asynchronous between the processor and the storage device.

In the synchronous I/O scheme, after the processor transmits a command to the storage device, the processor does not issue the next command until the previous command is executed and a response message is received from the storage device. The storage device may be an embedded MultiMedia Card (eMMC), a Secure Digital (SD) card, or the like. The storage device operating in this manner is called a synchronous storage device.

In the asynchronous I/O scheme, after the processor transmits a command to the storage device, the processor may process another command before the transmitted command is executed and a response message is received from the storage device. The storage device may be a Solid State Drive (SSD) or the like. This type of storage device is called an asynchronous storage device.

The above information is presented as background information only to assist with an understanding of the present disclosure. No determination has been made, and no assertion is made, as to whether any of the above might be applicable as prior art with regard to the present disclosure.

SUMMARY

The storage device may perform housekeeping operations including garbage collection, wear-leveling, and the like as done in a flash memory as well as a write operation in the process of processing a write request.

An asynchronous storage device may process a read request above all other things by internal functions such as command queuing and command reordering. Alternatively, since a synchronous storage device does not have a command queuing function, the synchronous storage device may process the next request only after completely processing the previous request. As a result, the speed that a user of an electronic device feels may be decreased.

To address the above-discussed deficiencies, it is a primary object to provide a data processing method of an I/O storage device to increase responsiveness to a read operation by improving a method for processing a write operation, and a storage device.

In accordance with an aspect of the present disclosure, an embodiment provides a method for processing data in a storage device. The method includes writing data according to a write command received from a processor. The method also includes determining whether a predetermined write restriction time has elapsed. The method also includes discontinuing the data writing upon expiration of the predetermined write restriction time.

In accordance with another aspect of the present disclosure, an embodiment provides a method for processing data in a storage device. The method includes writing data to a memory according to a write command received from a processor. The method also includes determining whether write time restriction has been set. The method also includes determining whether a predetermined write restriction time has elapsed, if the write time restriction has been set. The method also includes discontinuing the data writing upon expiration of the predetermined write restriction time.

In accordance with another aspect of the present disclosure, an embodiment provides a storage device including a memory configured to write data according to a write command received from a processor. The storage device also includes a processor configured to determine whether a predetermined write restriction time has elapsed. The processor is also configured to control discontinuation of the data writing upon expiration of the predetermined write restriction time.

In accordance with another aspect of the present disclosure, an embodiment provides a storage device including a memory configured to write data according to a write command received from a processor. The storage device also includes a controller configured to determine whether write time restriction has been set. The controller is also configured to determine whether a predetermined write restriction time has elapsed if the write time restriction has been set. The controller is also configured to control discontinuation of the data writing upon expiration of the predetermined write restriction time.

Other aspects, advantages, and salient features of the disclosure will become apparent to those skilled in the art from the following detailed description, which, taken in conjunction with the annexed drawings, discloses example embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or method. The following description with reference to the accompanying drawings is provided to assist in a comprehensive understanding of example embodiments of the disclosure as defined by the claims and their equivalents. It includes various specific details to assist in that understanding but these are to be regarded as merely example. Accordingly, those of ordinary skilled in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of example embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

With reference to FIGS. 1 to 4, Input/Output (I/O) methods of a storage device to which embodiments of the present disclosure are applied will first be described below. Then a description will be given of an apparatus and method according to embodiments of the present disclosure with reference to FIGS. 5, 6, and 7.

Figure 1:
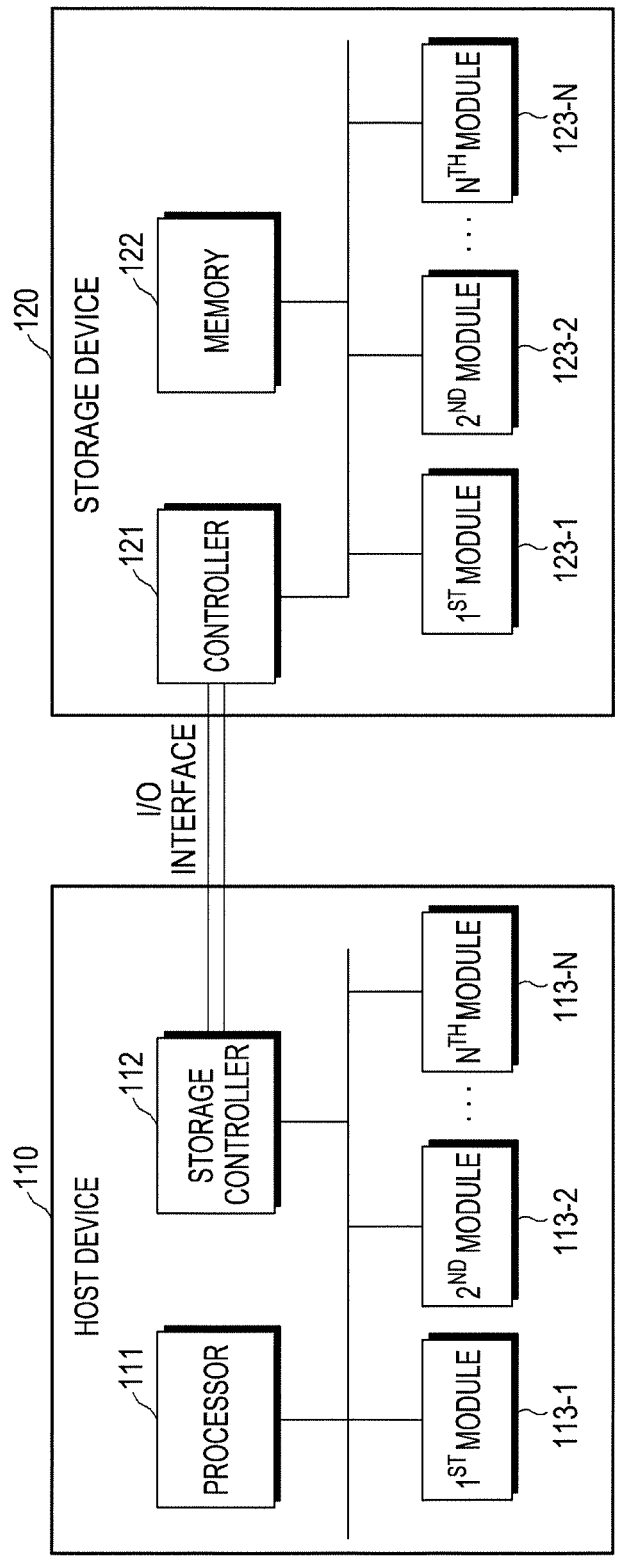
FIG. 1 illustrates a block diagram of a host device and a storage device according to an embodiment of the present disclosure.

FIG. 1 illustrates a block diagram of a host device and a storage device according to an embodiment of the present disclosure. Referring to FIG. 1, a host device 110 may include a processor 111, a storage controller 112, and at least one module 113. A storage device 120 may include a controller 121, a memory 122, and at least one module 123.

Components of the host device 110 may communicate with each other via an internal bus. Likewise, components of the storage device 120 may communicate with each other via an internal bus.

The host device 110 may be connected to the storage device 120 through an I/O interface. For example, the storage controller 112 of the host device 110 may be connected to the controller 121 of the storage device 120 via an I/O interface as illustrated in FIG. 1. Accordingly, the storage controller 112 of the host device 110 and the controller 121 of the storage device 120 may perform operations related to the interface.

Figure 2:
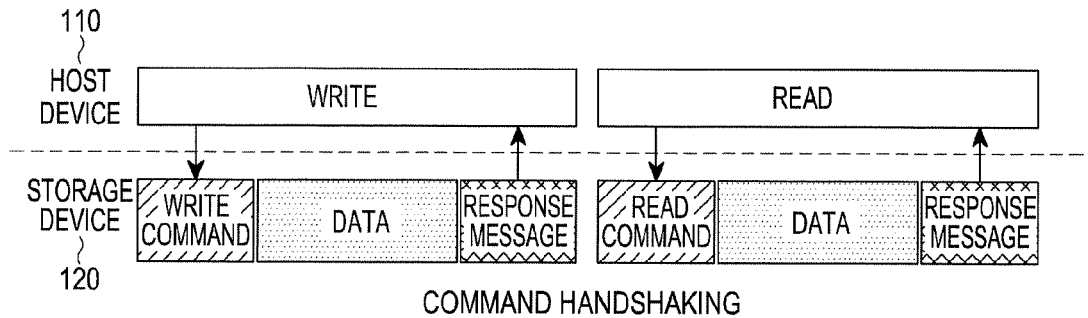
FIG. 2 illustrates an Input/Output (I/O) operation of a storage device according to an embodiment of the present disclosure.
Figure 3:
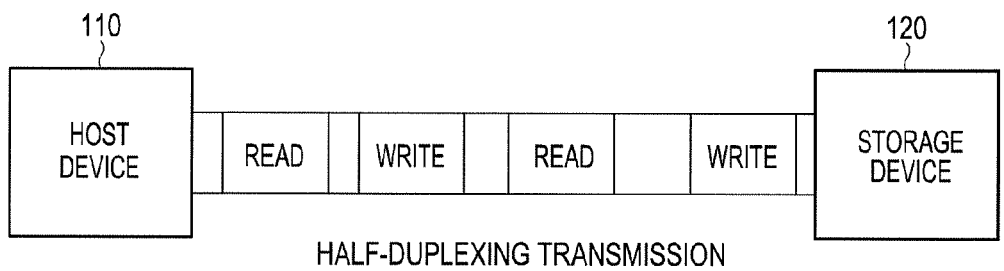
FIG. 3 illustrates a half-duplexing transmission method of a storage device according to an embodiment of the present disclosure.
Figure 4:
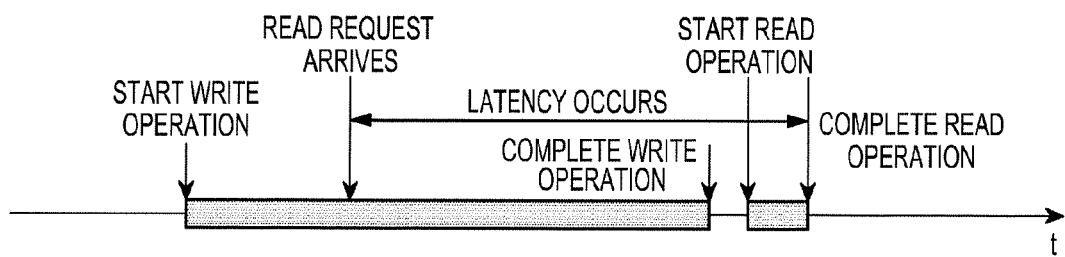
FIG. 4 illustrates process latency of a synchronous storage device according to an embodiment of the present disclosure.

If embodiments of the present disclosure are applied to the I/O interface between the host device 110 and the storage device 120, the I/O interface may operate in the manner illustrated in FIGS. 2, 3, and 4.

FIG. 2 illustrates an I/O operation of a storage device according to an embodiment of the present disclosure. Referring to FIG. 2, when the host device 110 transmits a write command and then write data to the storage device 120, the storage device 120 writes the write data received from the host device 110 in a memory area. Upon completion of the write operation of the data, the storage device 120 may transmit a response message regarding completion of executing the command to the host device 110.

After receiving the response message regarding the completion of executing the previous command, the host device 110 may transmit the next command (for example, a read command) to the storage device 120. For example, if the host device 110 transmits a read command and address information about read data to the storage device 120, the storage device 120 transmits data read from an address indicated by the address information to the host device 110. Upon completion of the read operation, the storage device 120 may transmit a response message regarding completion of executing the read command to the host device 110.

According to the I/O processing method illustrated in FIG. 2, the storage device may need to transmit a response message regarding completion of executing a previous command.

FIG. 3 illustrates a half-duplexing transmission method of a storage device according to an embodiment of the present disclosure. In the half-duplexing transmission method, while bi-directional data transmission is possible between the host device 110 and the storage device 120, transmission may only be possible in one direction under circumstances. Therefore, an input operation and an output operation may not be performed simultaneously. The method illustrated in FIG. 2 is based on the half-duplexing transmission method of FIG. 3. FIG. 4 illustrates process latency of a synchronous storage device according to an embodiment of the present disclosure. If the host device transmits a write request before a read request (for example, if the host device requests a read operation to the storage device after transmitting a write command), the synchronous storage device first performs a data write operation and an internal management operation. Thus, processing of the read request may be delayed by the time taken to perform the write operation and the internal management operation. For example, a read operation may be delayed by a long write operation time, as illustrated in FIG. 4.

Performance degradation resulting from the read delay is readily perceivable to a user. For example, in the embodiment where data is duplicated on a synchronous storage device such as an eMMC, an SD card, or the like, while a pre-stored high-resolution video is being played back from the synchronous storage device, performance degradation may occur. In this example, the data duplication and the video playback may be performed as a write operation and a read operation, respectively inside the storage device. For example, for a video played back at a rate of 30 frames per second, the time interval between frames (i.e., read data) may be assumed to be 1/30=33 ms. If a write operation to an eMMC or an SD card is completed within 33 ms, no read delay occurs. However, an actual write operation time may range from 10 ms to 350 ms depending on a product group and a manufacturer. Therefore, a number of synchronous storage devices such as eMMCs, SD cards, and the like may suffer from frame loss caused by a read delay.

Because the synchronous storage device does not have a command queuing function as described before, the synchronous storage device may process a next request only when a previous request is completely processed. This may be a significant factor that degrades performance perceivable to a user of an electronic device.

Accordingly, the responsiveness of a read operation requested after a write command may be increased by improving a method for processing a write operation to a synchronous I/O storage device in various embodiments of the present disclosure, as described below with reference to FIGS. 5, 6, and 7.

Figure 5:
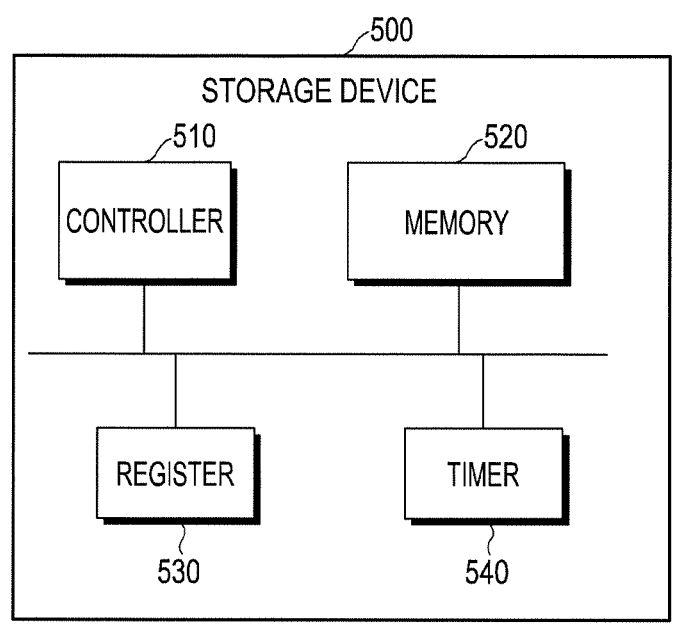
FIG. 5 illustrates a detailed block diagram of a synchronous storage device according to an embodiment of the present disclosure.

FIG. 5 illustrates a detailed block diagram of a synchronous storage device according to an embodiment of the present disclosure. Referring to FIG. 5, a storage device 500 according to an embodiment of the present disclosure may include a controller 510 and a memory 520. In various embodiments of the present disclosure, the storage device 500 may further include a register 530 or a timer 540.

The storage device 500 may manage a processing time for a write request (hereinafter, referred to as a 'write restriction time'), preset or set according to a command from a processor, as a constant or a variable and may start a timer based on the write restriction time, thereby ensuring a certain response time for a read request following the write request. For this purpose, each function block operates as follows.

The controller 510 may provide overall control to operations of the storage device 500. For example, upon receipt of a write command from the processor, the controller 510 may control writing of received data to the memory 520 according to a synchronous I/O scheme. Upon completion of the write operation according to the received write command, the controller 510 may generate a write complete message and transmit the write complete message to the processor.

In an embodiment of the present disclosure, upon receipt of a write command from the processor, the controller 510 may check a mode state set in the register 530. If the current mode is a write restriction setting mode (referred to as a 'preemptive read response mode'), the controller 510 may start the timer 540 according to a write restriction time which has been set.

Accordingly, upon expiration of the write restriction time to which the timer 540 has been set, the write operation may be terminated or discontinued forcibly even though the write operation has not been completed. Herein, the controller 510 may store, in the register 530, information about the size of data written to the memory 520 until the write operation is discontinued, with respect to the total size of data to be written according to the write command. The controller 510 may consider the forced termination of the write operation based on the setting of the timer 540 to be a normal state, not an abnormal state.

In an embodiment of the present disclosure, the controller 510 may transmit a response message including information about the write discontinuation state, information about the size of the partially written data, information indicating whether the write operation has been completed, and the like to the processor that has requested the write operation.

The register 530 may store information about an operation mode of the synchronous storage device 500 (for example, information indicating whether the preemptive read response mode has been set), a value set as a write restriction time for the preemptive read response mode, information about an operation state of the storage device 500, and the like.

The memory 520 is a medium that stores actual data. The memory 520 may be a Non-Volatile Memory (NVM) such as a NAND flash memory. If the storage device 500 has been set to the preemptive read response mode in an embodiment of the present disclosure, the timer 540 may be used to manage an internal data write operation time, as described before.

The components of the storage device 500 may be interconnected through an arbitrary bus structure and the controller 510 may be connected to a host device via an I/O interface.

While the above description has been given with the appreciation that the controller 510 is incorporated in the storage device 500, the controller 510 may be disposed in a host device connected to a system bus in another embodiment of the disclosure (for example, in the embodiment of an NVM storage device without a memory controller). Additionally, a main processor of the host device may serve as a memory control function block for a memory system, irrespective of whether the storage device includes a controller.

In embodiments of the present disclosure, a function block or a module may mean a functional and structural combination of hardware for implementing the technical spirit of the embodiments of the present disclosure and software for driving the hardware. For example, each function block may refer to a logical unit of specific code and hardware resources for executing the specific code. Those skilled in the art will readily understand that the function block is not necessarily a physically connected code or one type of hardware.

Figure 6:
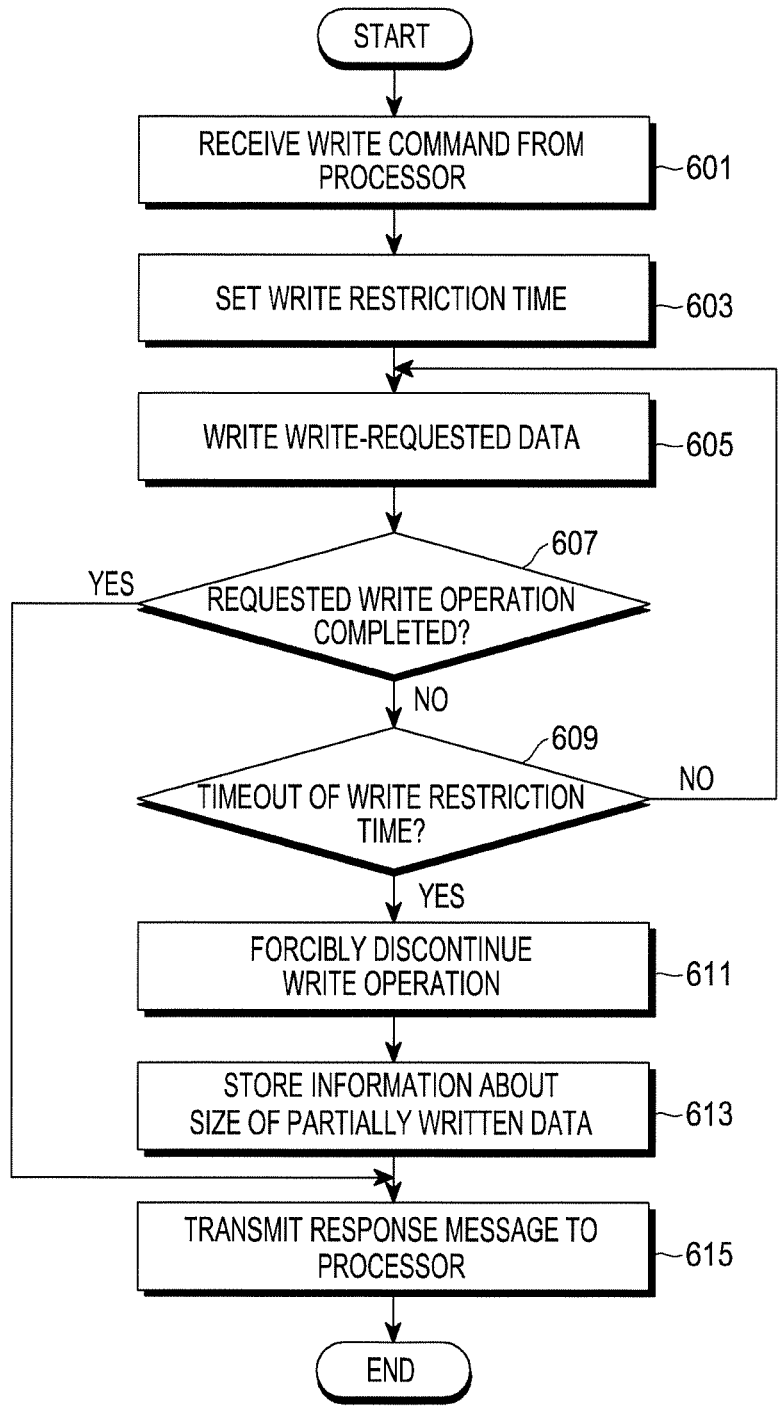
FIG. 6 illustrates a process of a data processing operation in a storage device according to an embodiment of the present disclosure.

FIG. 6 illustrates a process of a data processing operation in a storage device according to an embodiment of the present disclosure. Referring to FIG. 6, the storage device may receive a write command from a processor in operation 601. In operation 603, the storage device may set a write restriction time for write-requested data in an embodiment of the present disclosure. The write restriction time may be preset in the storage device before the write command is received or write restriction time information may be received from the processor and the write restriction time may be set based on the write restriction time information.

A controller of the storage device may write the write-requested data to a memory in operation 605 and determine whether the write-requested data has been completely written in operation 607. If the write-requested data has not been completely written, the controller determines whether the write restriction time has expired in operation 609. Upon expiration of the write restriction time, the controller may discontinue or terminate the on-going write operation forcibly according to an embodiment of the present disclosure in operation 611.

The controller of the storage device may store information about the size of partially written data in a register in operation 613 and may transmit a response message to the processor that has requested the write operation in operation 615.

The response message may include at least one of information about a write discontinued state stored in the register, information about the size of partially written data, and information indicating whether a write operation has been completed in an embodiment of the present disclosure.

While it has been described in FIG. 6 that the storage device has been set to the write restriction setting mode (that is, the preemptive read response mode) described before with reference to FIG. 5, which should not be construed as limiting the embodiments of the present disclosure, many modifications may be made to the embodiments of the present disclosure, as described below.

For example, the host device may transmit a command to set the preemptive read response mode to the storage device. The controller of the storage device may read a current mode state from the register in response to the command. If the current mode of the storage device is not the preemptive read response mode, the controller may record a setting value (for example, a write restriction time) in the register and switch the storage device to the preemptive read response mode. Alternatively, if the current mode set in the register is the preemptive read response mode, the controller may operate in the current mode without an additional mode switching operation.

Since the preemptive read response mode has been set, the storage device may activate a timer each time it receives a write command from the processor. The write restriction time set for the timer may be equal for all write requests or different for each individual write request.

If the storage device does not complete a write operation within the write time set for the timer (that is, the write restriction time), the size of written data may be recorded in the register and the on-going write operation may be forcibly terminated. Herein, the storage device may process timeout of the timer as a normal state.

The storage device may also transmit to the processor a response message including information related to a current forced write termination state (for example, the size of partially written data, information indicating whether the write operation has been completed), and the like) due to the preemptive read response mode.

The controller of the storage device may release the preemptive read response mode, for example, by setting a flag in a specific field of the register.

The value set for the timer (that is, the write restriction time) may be changed in the following situation according to various embodiments of the present disclosure.

For example, different timer values may be set for a terminal not requiring I/O multitasking and a terminal requiring I/O multitasking in the same storage device. In an embodiment, there is no need for preemptive read processing in an application scenario in which one of write and read operations is repeated during operation, such as a Closed Circuit TeleVision (CCTV) or a camcorder. Therefore, a relatively long write restriction time may be set. In contrast, in the embodiment of multitasking in a device such as a smartphone, a Personal Computer (PC), or the like, a relatively short write restriction time may be set for preemptive processing of a read operation.

In another example, if only write requests are queued in an I/O request queue of an Operation System (OS) even in the I/O multitasking-requiring scenario, the write restriction time may be lengthened to optimize write performance.

In an embodiment of the present disclosure, an I/O scheduler of the OS may retry a write request that has not been completely processed due to write restriction timeout, based on a response message.

Figure 7:
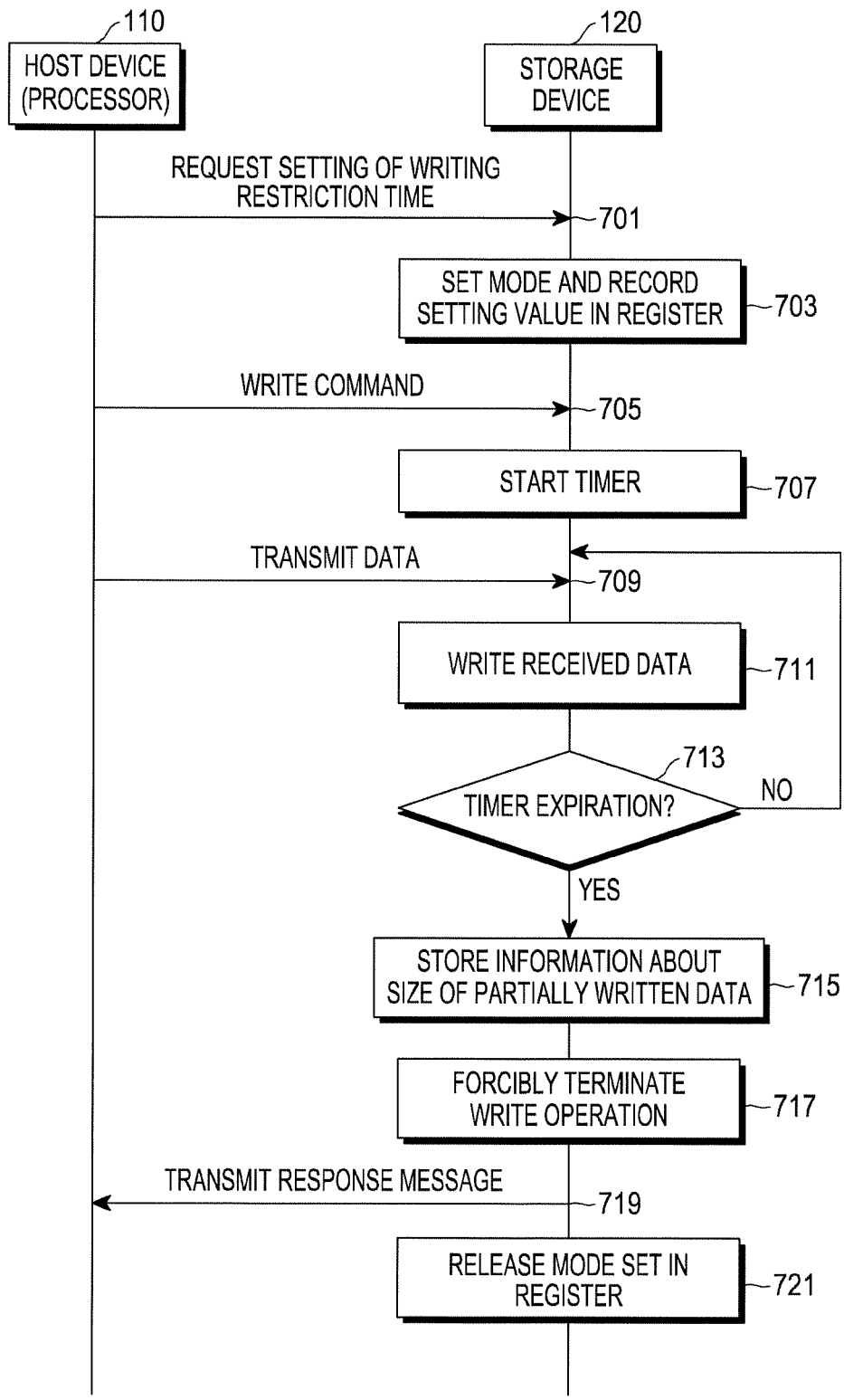
FIG. 7 illustrates a diagram showing a signal flow for a data processing operation between a host device and a storage device according to an embodiment of the present disclosure.

FIG. 7 illustrates a diagram showing a signal flow for a data processing operation between a host device and a storage device according to an embodiment of the present disclosure. Referring to FIG. 7, the host device 110 may request setting of a write restriction time to the storage device 120 in operation 701. In operation 703, the storage device 120 may check a mode set in the register and record a setting value (for example, a write restriction time) in the register.

When the host device 110 transmits a write command to the storage device 120 in operation 705, the storage device 120 may activate a timer according to the set write restriction time in operation 707.

Then the host device 110 transmits data to the storage device 120 in operation 709 and the storage device 120 writes the received data to the memory in operation 711.

Upon expiration of the timer in operation 713 before the write operation is completed in operations 709 and 711, the storage device 120 may store information about the size of data written so far in the register in operation 715 and may forcibly terminate the write operation according to an embodiment of the present disclosure in operation 717.

Subsequently, the storage device 120 may transmit a response message to the host device 110 in operation 719 and may release the mode set in the register (for example, the preemptive read response mode) in operation 721.

The proposed method for processing data in a storage device, and storage device may be implemented as computer-readable code in a computer-readable recording medium. The computer-readable recording medium may include any kind of recording device storing computer-readable data. Examples of the recording medium may include Read Only Memory (ROM), Random Access Memory (RAM), optical disk, magnetic tape, floppy disk, hard disk, non-volatile memory, and the like, and may also include the medium that is implemented in the form of carrier waves (for example, transmission over the Internet). In addition, the computer-readable recording medium may be distributed over the computer systems connected over the network, and computer-readable codes may be stored and executed in a distributed manner.

As is apparent from the foregoing description, the responsiveness of a read operation can be increased by improving a method for processing a write operation in an I/O storage device. For example, a situation requiring fast read responsiveness of a read operation for a host may be indicated to the storage device by a command. The storage device can process a read request requiring real-time responsiveness without a command queuing function adopted in an asynchronous storage device.

Although the present disclosure has been described with an example embodiment, various changes and modifications may be suggested to one skilled in the art. It is intended that the present disclosure encompass such changes and modifications as fall within the scope of the appended claims.

What is claimed is:

1. A method for processing data in a storage device, the method comprising:
   receiving, at the storage device, a write command from a processor of a host device;
   responsive to receiving the write command, starting, at the storage device, a timer for a predetermined write restriction time;
   writing data according to the write command received from the processor of the host device;
   determining, at the storage device, whether the predetermined write restriction time has elapsed;
   discontinuing, at the storage device, the data writing upon expiration of the predetermined write restriction time; and
   responsive to discontinuing the data writing, transmitting a response message to the processor of the host device, wherein the response message comprises information related to the data written until a discontinued point in time,
   wherein the write restriction time for each write command of the processor of the host device is based on whether input or output multitasking is required at the host device.

2. The method of claim 1, wherein the response message comprises information about a size of data written until the data writing is discontinued.

3. The method of claim 1, wherein the response message comprises information indicating whether the write command has been completely executed.

4. The method of claim 1, wherein the processor of the host device sets the write restriction time.

5. The method of claim 1, wherein the write restriction time is equal for each write command of the processor of the host device.

6. The method of claim 1, wherein the write restriction time is different for each write command of the processor of the host device.

7. A method for processing data in a storage device, the method comprising:
   receiving, at the storage device, a write command from a processor of a host device;
   responsive to receiving the write command, starting, at the storage device, a timer for a predetermined write restriction time;
   writing data to a memory according to the write command received from the processor of the host device;
   determining whether write time restriction has been set;
   determining, at the storage device, whether the predetermined write restriction time has elapsed if the write time restriction has been set; and
   discontinuing, at the storage device, the data writing upon expiration of the predetermined write restriction time
   responsive to discontinuing the data writing, transmitting a response message to the processor of the host device, wherein the response message comprises information related to the data written until a discontinued point in time,
   wherein the write restriction time for each write command of the processor of the host device is based on whether input or output multitasking is required at the host device.

8. The method of claim 7, further comprising, if the data writing has not been completed until the write restriction time elapses, storing information about a size of data written until the data writing is discontinued.

9. The method of claim 7, wherein the response message comprises information about a size of data written until the data writing is discontinued.

10. The method of claim 7, wherein the response message comprises information indicating whether the write command has been completely executed.

11. The method of claim 7, wherein the processor of the host device sets the write restriction time.

12. The method of claim 7, wherein the write restriction time is equal for each write command of the processor of the host device.

13. The method of claim 7, wherein the write restriction time is different for each write command of the processor of the host device.

14. A storage device comprising:
   a memory configured to write data according to a write command received from a processor of a host device; and
   a controller coupled to the memory, the controller configured to:
      responsive to receiving the write command, start, at the storage device, a timer for a predetermined write restriction time,
      determine whether the predetermined write restriction time has elapsed,
      control discontinuation of the data writing upon expiration of the predetermined write restriction time, and
      responsive to discontinuing the data writing, transmit a response message to the processor of the host device, wherein the response message comprises information related to the data written until a discontinued point in time,
   wherein the write restriction time for each write command of the processor of the host device is based on whether input or output multitasking is required at the host device.

15. The storage device of claim 14, wherein the response message comprises information about a size of data written until the data writing is discontinued.

16. The storage device of claim 14, wherein the response message comprises information indicating whether the write command has been completely executed.

17. The storage device of claim 14, wherein the processor of the host device is configured to set the write restriction time.

18. The storage device of claim 14, wherein the write restriction time is equal for each write command of the processor of the host device.

19. The storage device of claim 14, wherein the write restriction time is different for each write command of the processor of the host device.

20. A storage device comprising:
   a memory configured to write data according to a write command received from a processor of a host device; and
   a controller coupled to the memory, the controller configured to:

responsive to receiving the write command, start, at the storage device, a timer for a predetermined write restriction time, determine whether write time restriction has been set, determine whether the predetermined write restriction time has elapsed if the write time restriction has been set, and control discontinuation of the data writing upon expiration of the predetermined write restriction time responsive to discontinuing the data writing, transmit a response message to the processor of the host device, wherein the response message comprises information related to the data written until a discontinued point in time, wherein the write restriction time for each write command of the processor of the host device is based on whether input or output multitasking is required at the host device.

21. The storage device of claim 20, wherein if the data writing has not been completed until the write restriction time elapses, the processor stores, in the memory, information about a size of data written until the data writing is discontinued.

22. The storage device of claim 20, wherein the response message comprises information about a size of data written until the data writing is discontinued.

23. The storage device of claim 20, wherein the response message comprises information indicating whether the write command has been completely executed.

24. The storage device of claim 20, wherein the processor of the host device is configured to set the write restriction time.

25. The storage device of claim 20, wherein the write restriction time is equal for each write command of the processor of the host device.

26. The storage device of claim 20, wherein the write restriction time is different for each write command of the processor of the host device.

27. The method of claim 1, wherein the write command is received, at the storage device, from the processor of the host device using a synchronous input/output scheme.

28. The storage device of claim 14, wherein the write command is received, at the storage device, from the processor of the host device using a synchronous input/output scheme.

29. The method of claim 1, wherein the write restriction time is set based on a mode, and wherein the mode is released after the response message is transmitted.

* * * * *